United States Patent
Bartlett et al.

(10) Patent No.: US 8,111,705 B1
(45) Date of Patent: Feb. 7, 2012

(54) PROVIDING ACCESS-NETWORK INFORMATION TO AN IP-CORE PORTION OF A WIRELESS TELECOMMUNICATION NETWORK

(75) Inventors: Roger Danforth Bartlett, Merriam, KS (US); Kent DeLancy Mabee, San Diego, CA (US); Kristen Ann Hayne, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 133 days.

(21) Appl. No.: 12/512,287

(22) Filed: Jul. 30, 2009

(51) Int. Cl.
H04L 12/56 (2006.01)
(52) U.S. Cl. ....................................................... 370/401
(58) Field of Classification Search .................. 370/331, 370/401; 709/203, 217; 455/435.1, 432.1, 455/433
See application file for complete search history.

(56) References Cited

U.S. PATENT DOCUMENTS

| | | | |
|---|---|---|---|
| 7,130,629 B1 * | 10/2006 | Leung et al. | 455/435.1 |
| 7,366,509 B2 * | 4/2008 | Akgun et al. | 455/435.1 |
| 7,805,754 B2 * | 9/2010 | Song et al. | 726/4 |

* cited by examiner

*Primary Examiner* — Ricky Ngo
*Assistant Examiner* — Chandrahas Patel

(57) ABSTRACT

Systems, products, and methods are disclosed for enabling an action to take place based on data-usage characteristics associated with a mobile device. This can include receiving a request from the mobile device to receive an IP address (which request is communicated through a base transceiver station), adding to the registration request an identifier that identifies the BTS, and communicating the modified registration request to an IP-address-allocation device that reserves the IP address for the mobile device.

15 Claims, 7 Drawing Sheets

US 8,111,705 B1

PROVIDING ACCESS-NETWORK INFORMATION TO AN IP-CORE PORTION OF A WIRELESS TELECOMMUNICATION NETWORK

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter. In brief and at a high level, this disclosure describes, among other things, ways of making a core network of a wireless telecommunications network aware of actions in an access portion so that an action can be taken (such as rerouting traffic, regulating a flow of traffic, monitoring traffic, routing traffic, or other).

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
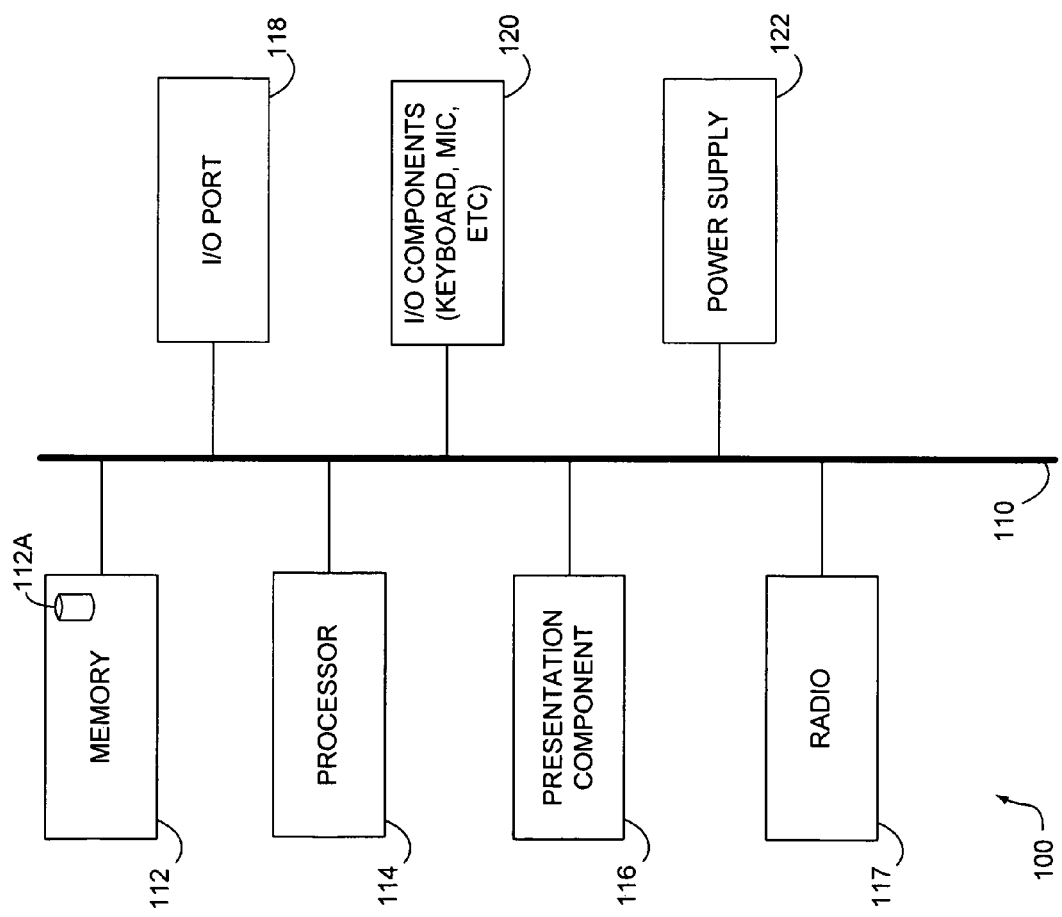
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| BSID | Base-Station Identifier |
| BTS | Base Transceiver Station/Base Station |
| CDMA | Code Division Multiple Access |
| DPI | Deep-Packet Inspection |
| FA | Foreign Agent |
| GIS | Geographic/Geospatial Information System |
| GGSN | GPRS Gateway Support Node |
| GPRS | General Packet Radio Service |
| GSM | Global System for Mobile communications (Groupe Special Mobile) |
| IP | Internet Protocol |
| LED | Light Emitting Diode |
| LTE | Long Term Evolution |
| MIP | Mobile IP |
| NAI | Network Address Identifier |
| PDA | Personal Data Assistant |
| PDSN | Packet Data Serving Node |
| SGSN | Serving GPRS Support Node |
| TDMA | Time division multiple access |
| UMTS | Universal Mobile Telecommunications System |
| WiMAX | Worldwide Interoperability for Microwave Access |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like (including what is known in the art as WiMax technology and also Long Term Evolution (LTE). In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 110. Power supply 122 includes items such as batteries, fuel cells, or any other component that can act as a power source to power mobile device 100.

Figure 2:
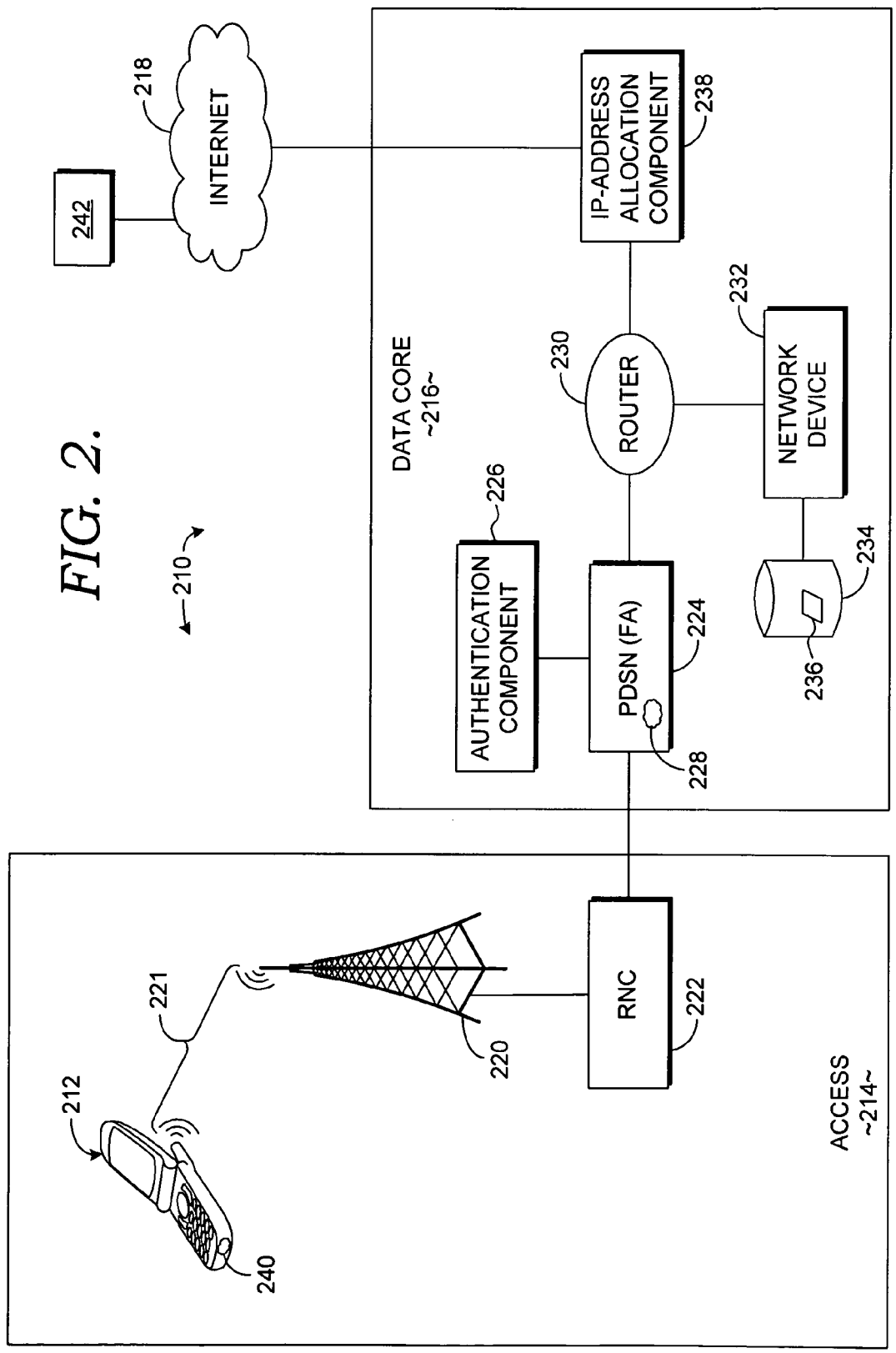
FIG. 2 depicts an illustrative operating environment suitable for practicing an embodiment of the present invention.

Turning now to FIG. 2, an illustrative operating environment is provided and referenced generally by the numeral 210. In one embodiment, an operating environment enables a mobile communications device 212 to communicate through a wireless telecommunications network, which is shown as being schematically apportioned into an access portion 214 and a data core 216. All aspects of a wireless telecommunications network are not shown so as to prevent obscuring aspects of the present invention. Moreover, various components of access portion 214 (which are variously referred to as an access network) and data core 216 are also not shown so as to not obscure the present invention. We do not mean to imply that an access portion 214 and a data core 216 are clearly able to be delineated; rather, we illustratively show two portions so that we will be able to later communicate to the reader a concept of providing to a core data network information related to an access network that historically it has not had before. Thus, access portion 214 refers to the portion of a wireless telecommunications network that provides communications access to mobile device 212. Data core (which is variously referred to as "core," "data," "core data," or other) refers to a portion of the network that helps facilitate providing data access to mobile device 212. To provide access to mobile device 212 is to provide access to things like the Internet 218, television reception, e-mail reception, picture mail, and the like. When we refer to data access or communicating data we are referring to any action that requires mobile device 212 to receive an IP address in order to carry out that action. Some technologies can facilitate voice calls without mobile device 212 receiving an IP address. Thus, not all wireless communications require mobile device 212 to be given an IP address. Normally, IP addresses identify devices on private or public networks.

Mobile device 212 communicates with a base transceiver station 220 by way of a wireless link 221. Base transceiver station 220 is also known as a "base station" or by the acronym "BTS." In some embodiments, base station 220 is coupled to radio network controller RNC 222 that passes data to a packet data serving node PDSN 224, which is sometimes known as a foreign agent (FA). In some embodiments, the functionality offered by RNC 222 is subsumed into other elements, the description of which is not particularly relevant.

PDSN 224 helps manage communications sessions between data core 216 and base station 220. Although we label device 224 as a PDSN, any device that provides similar functionality is contemplated within the scope of this disclosure and whenever we refer to a PDSN. For example, a GGSN offers similar functionality in networks that utilize GSM or UMTS technology. At a high level, PDSN 224 help provide access to the Internet as well as other network technologies such as intranets and application servers. It helps provide mobile IP (MIP) access, foreign-agent support, and transportation of packets to facilitate tunneling or communicating data through virtual private networks. It can act as a client for authentication component 226, which ensures that mobile device 212 is authorized to communicate via the wireless telecommunications network. In some embodiments, authentication component 226 is known as an authentication, authorization, and accounting (AAA) server. In one embodiment, PDSN 224 includes a set of computer executable instructions 228 that, when executed, help carry out various aspects of the present invention.

A router 230 routes packets received from PDSN 224 to various components as determined by the headers of the various packets. In one embodiment of our technology, router 230 serves as a tap so that copies of packets or information regarding the packets is directed to a network device 232 that, for example, can inspect data associated with the packets, which data can be stored in network device 232 or a database 234, which includes a data structure 236 in some embodiments. Network device 232 can be a variety of devices as the case may be. Data structure 236 resides in network device 232 in some embodiments.

An IP-address-allocation component 238 is coupled to router 230. In one embodiment, IP-address-allocation component 238 is responsible for allocating or reserving an IP address that is to be assigned to mobile device 212 incident to receiving a registration request. In one embodiment, IP-address-allocation component 238 is what is referred to, in the art as a "home agent" but can be any computing device that has an ability to allocate an IP address to mobile device 212.

Historically, PDSN 224 would receive a registration request from mobile device 212 and forward the request to home agent 238. Home agent 238 only requires a certain amount of information in order to allocate an IP address to mobile device 212. One of the key pieces of information that is to be provided to home agent 238 is the NAI of mobile device 212, which is referenced by numeral 240. NAI 240 uniquely identifies mobile device 212 to the network. That is, NAI 240 is an address identifier that addresses mobile device 212 such that it is unique among thousands or millions of mobile devices that communicate with the wireless telecommunications network.

NAI 240 is not usable by many components outside of the wireless telecommunications network. That is, a computing device such as computer 242 that is coupled to the Internet 218 would not be able to communicate directly with mobile device 212 solely by way of NAI 240. Of course NAI 240 could be used in connection with various other identifiers so that a remote device such as computer 242 could communicate with mobile device 212, but one mechanism that is already in place that would allow such direct communication includes IP addresses. That is, if mobile device 212 received an IP address, then it could communicate data easily between itself and a device such as remotely located computer 242 that is outside of the wireless telecommunications network (214, 216).

Thus, in the past, information such as a base-station identifier that identifies base station 220 has not been passed from PDSN 224 through router 230 because home agent 238 would have no need or use of such identifier. A BSID is not necessary in order to allocate an IP address to mobile device 212, and including it would cost resources, which are sought to be conserved to reduce time and money and to increase efficiency. In many ways, there was a disconnect between data core 216 and access network 214 such that data core 216 had little visibility regarding various happenings that were taking place in access network 214.

In an embodiment of our technology, PDSN 224 includes the identifier of base station 220, thereby enabling router 230 to facilitate network device 232 to retrieve NAI 240 along with the base-station identifier and ultimately a corresponding IP address that home agent 238 allocates in response to receiving a registration request. As will be explained in greater detail below, in operation, mobile device 212 attempts to access the wireless telecommunications network. This attempt includes submitting a registration request, which is received by PDSN 224, which, according to an embodiment of our technology, adds an identifier that identifies base station 220 such that the BSID is present when the registration request is received at router 230 and optionally passed along to home agent 238. The home agent can disregard the additional information if desired. In other embodiments, home agent 238 or other devices such as network device 232 can inspect a format of the registration request in order to retrieve the added BSID.

Figure 3:
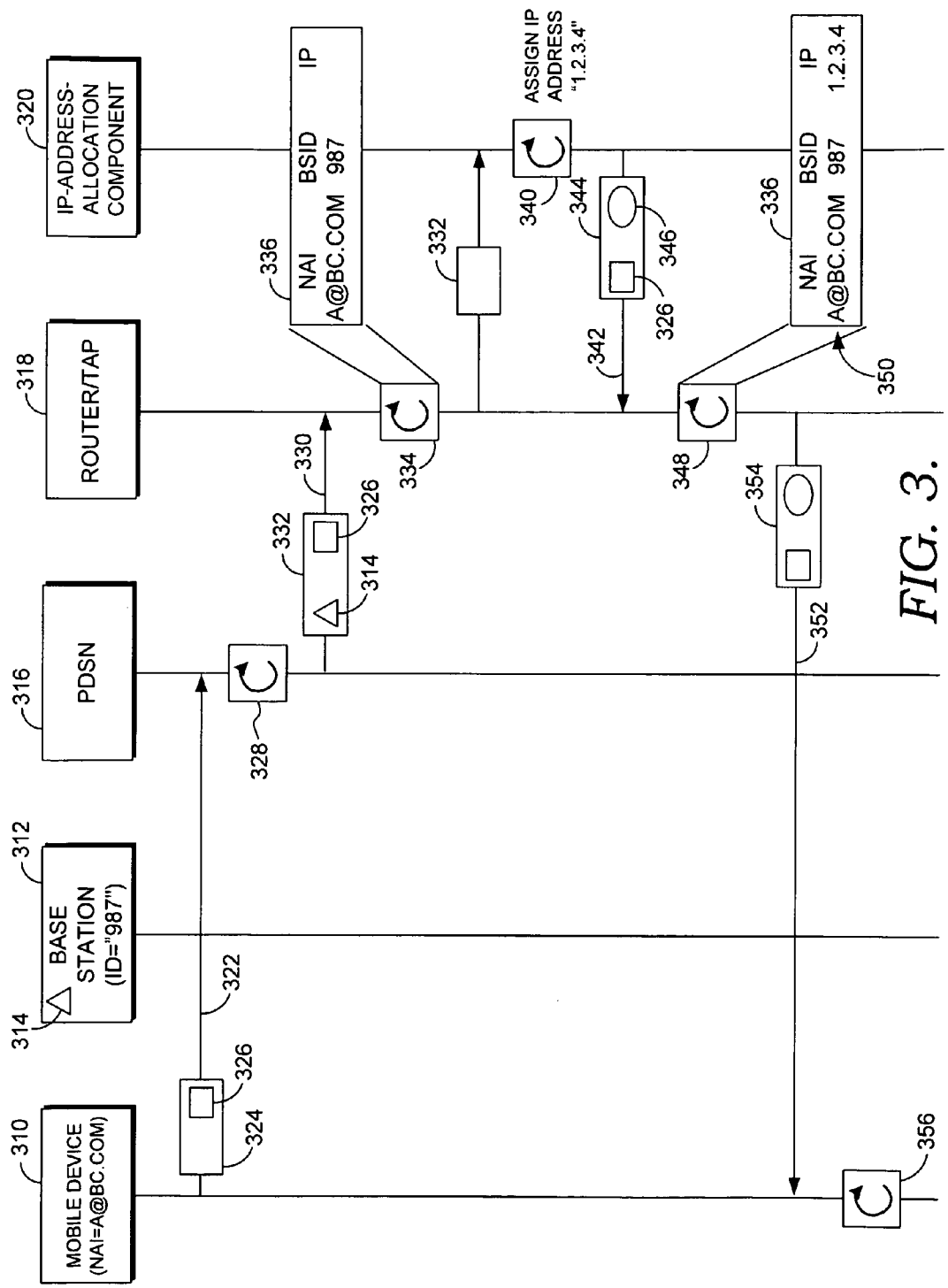
FIG. 3 depicts an illustrative flow diagram for enabling an action to take place based on data-usage characteristics of a mobile device.

Turning now to FIG. 3, one embodiment of enabling an action to take place based on data-usage characteristics associated with the mobile device is provided. As will be explained in greater detail below, the action that can be performed includes things such as throttling down a volume of data as being communicated to or from mobile device 212, routing a packet, performing deep-packet inspection (DPI) or a myriad of other things. FIG. 3 includes a mobile device 310, a base station 312 having a BSID 314 (which, for this example, is "987"), PDSN 316, a router 318, and an IP-address-allocation component 320.

Mobile device 310 may be of the same type as discussed in FIG. 1 and FIG. 2. We provide unique reference numerals to help with reading this patent-related document. To help provide an illustration, mobile device 310 has an NAI of "a@bc.com." Base station 312 can also be similar to base station 220 of FIG. 2. PDSN 316 can be any device that offers the functionality of a PDSN, which we previously mentioned while discussing PDSN 224. Router 318 could be any device that provides routing functionality including a switch or a device that operates as a tap, which facilitates providing copies of packets to some device such as mobile device 232, which can perform a variety of tasks such as deep-packet inspection or others. IP-address-allocation component 320 can be any device that is capable of reserving an IP address that should be allocated to a mobile device incident to receiving a registration request for the same.

We will now describe one embodiment of carrying out a method for performing an action based on data usage characteristics associated with a mobile device. At a step 322, a registration request 324 is communicated from mobile device 310 to PDSN 316. Registration request 324 includes an NAI that uniquely identifies mobile device 310 to a wireless telecommunications network. Registration request 324 is a request to ultimately receive an IP address so as to enable data communication between mobile device 310 and devices outside of a wireless telecommunications network, or even in some instances, devices within the network. At a step 328, PDSN 316 adds BSID 314 to registration request 324. Absent the present invention, BSID 314 would not be added by PDSN 316 because IP-address-allocation component 320 would not need this information in order to allocate an IP address to mobile device 310. But in an embodiment of our technology, we supplement the registration request with the base-station identifier so that it can be retrieved by one or more downstream components.

At a step 330, registration request 332 is forwarded to router 318. Registration request 332 includes NAI 326 as well as BSID 314. In one embodiment, router 318 performs an action 334 because BSID 314 is present. In other embodiments other devices besides router 318 perform this action.

For example, router 318 might forward registration request 332 to another device, which might perform a given action. An illustrative action includes storing information from the registration request in a data structure such as data structure 236. We show an illustrative data structure that is indicated by reference numeral 336. In data structure 336, it is shown that a record includes an NAI (aPbc.com) as well as an indication of a BSID ("987"). At this point, the IP portion of the record is not yet complete.

The registration request is forwarded to IP-address-allocation component 320, which reserves an IP address for mobile device 310 at a step 340. By way of illustration, the hypothetical address that might be assigned at step 340 is "1.2.3.4."

At a step 342, a response 344 is communicated back through router 318. In one embodiment, the response includes NAI 326 as well as an IP address 346. Response 344 might include additional information that is not shown. As previously mentioned, in some embodiments, IP-address-allocation component 320 is a home agent, which might disregard BSID 314. This is tolerable because the BSID was previously logged at step 334.

At a step 348, router 318 (or some other device) completes the record of data structure 336 so that the IP address is added along with a corresponding NAI and BSID. As can be seen in row 350, a complete record of information now exists that associates an NAI with a BSID with an IP address. Now, the core network 216 has knowledge of an event happening in access network 214. Namely, data packets that are bound for a specific mobile device (identifiable by the NAI) are known. Through which base stations they are being communicated will also be known because of our technology. Similarly, data communicated from mobile device 212 can also be monitored. Thus data can be monitored directionally so that network device 232 can perform analysis based on the types of traffic that come from mobile device 212 and that travel through a wireless telecommunications network because of commands sent from mobile device 212.

For example, if mobile device 212 requested that a song be downloaded, then because of our technology it can be observed that the specific song was requested as well as at the subsequent packets that make up the song and will be routed to mobile device 212 via base station 312. Accordingly, the data network can now take action based on what is happening in the access network. Thus one action that can be performed is to reroute communications to a different base transceiver station. Commonly, a mobile device such as mobile device 212 is serviceable by multiple base stations. Generally, the base station that offers the best signal or the highest signal strength to mobile device 212 will be used, but this is not necessary. At times, a seemingly less optable solution is actually preferred. For example, if mobile device 212 is communicating in a densely populated area by way of base station 220, which is shared with many tens or hundreds of mobile-device users, then rerouting traffic caused by mobile device 212 to another base station could actually be beneficial because more users will be better served as a result of freeing up the bandwidth allocated to servicing mobile device 212. Thus, this rerouting is an illustrative action that can be taken based on data-usage characteristics associated with mobile device 212. Namely, if mobile device 212 is being used to communicate a large amount of data, then a flow of data bound for the mobile device can be regulated as well as a flow of data from the mobile device. Thus, in another embodiment, instead of directing the traffic to another base station, the amount or speed by which data is communicated might be throttled down. This is tolerable in some situations where latency is not as critical as it is in other areas such as voice calls. For example delivering e-mail, communicating a picture, downloading a web page, and other types of things are very latency tolerant. And if a certain user is consuming a great deal of bandwidth, then the amount of bandwidth being consumed can be reduced by actions taken in the data core 216. Arming the data core 216 with knowledge about what is happening in the access network 214 can increase the overall user experience provided to users of the wireless telecommunications network (214 plus 216).

At a step 352, response 354 is communicated to mobile device 310, which registers its IP address at a step 356.

Figure 4:
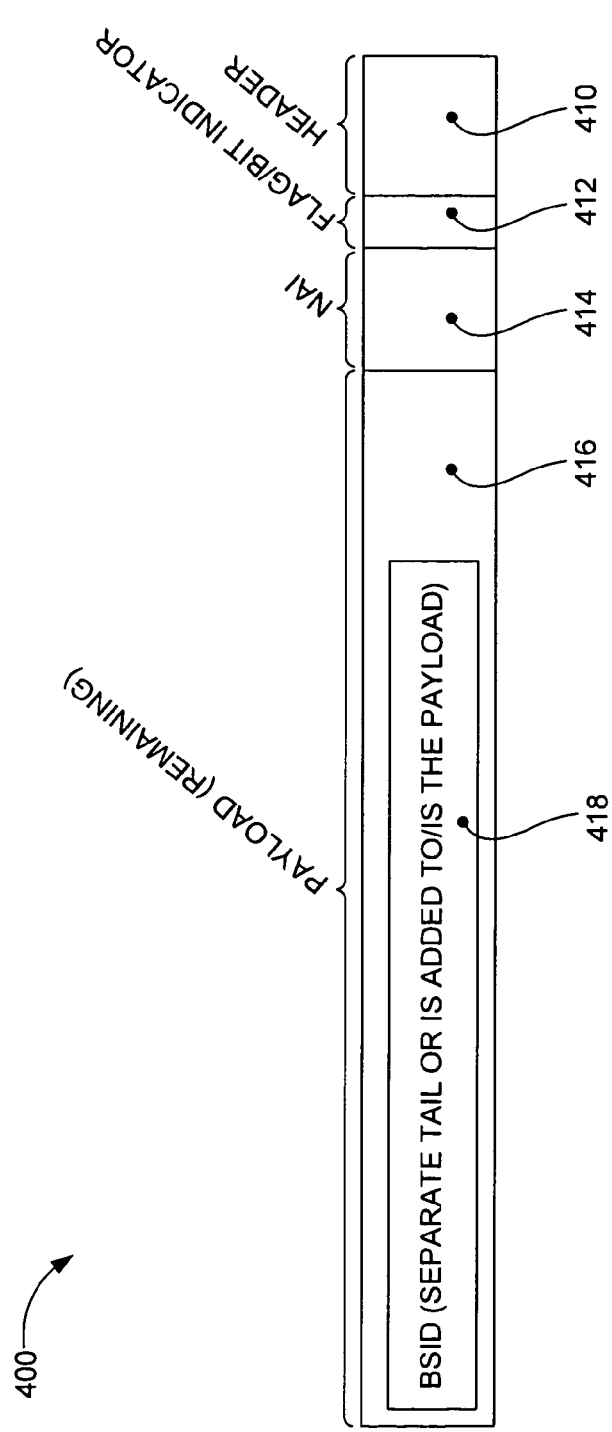
FIG. 4 depicts an illustrative registration request that has been supplemented to include a BSID.

Turning now to FIG. 4 an illustrative supplemented data packet 400 is provided. Data packet 400 includes a header 410, flag 412, NAI 414, and payload 416, which includes a BSID 418 in one embodiment. We do not mean to indicate that the order of the various portions of data packet 400 needs to be the way that they are shown. Rather, FIG. 4 is merely an illustrative example that shows that BSID 418 is added to (or forms) a payload portion 416 of a data packet. In some embodiments, flag 412 (which can also be a bit indicator) operates to indicate that BSID 418 is present. In some examples, flag 412 is not necessary if the processing device knows where to look for BSID 418 based on a predetermined knowledge of something such as a starting bit location of BSID 418. In other embodiments, flag 412 operates as a bit indicator to indicate a bit or byte location that marks a beginning and/or a range of bytes that make up BSID 418.

As explained, our technology enables a PDSN to send BSID information to a home agent so that this information can be gathered. In response to such an enriched registration request, the corresponding IP address is retrieved and stored in a data store such as data store 234 and in some embodiments in a data structure 236. This process can be repeated for re-registrations or even refresh instances, whenever the applicable BSID changes). With this information stored in an offline format, analysis can be performed so that aspects of the network can be improved. For example, knowing not only where packets came from or where they were bound but also through which base stations these packets traveled arms the core network with an ability to analyze traffic patterns and other metrics to make modifications to either the network, user accounts, or mobile devices. In some embodiments, this includes performing deep-packet inspection better than was possible without a corresponding BSID.

Figure 5:
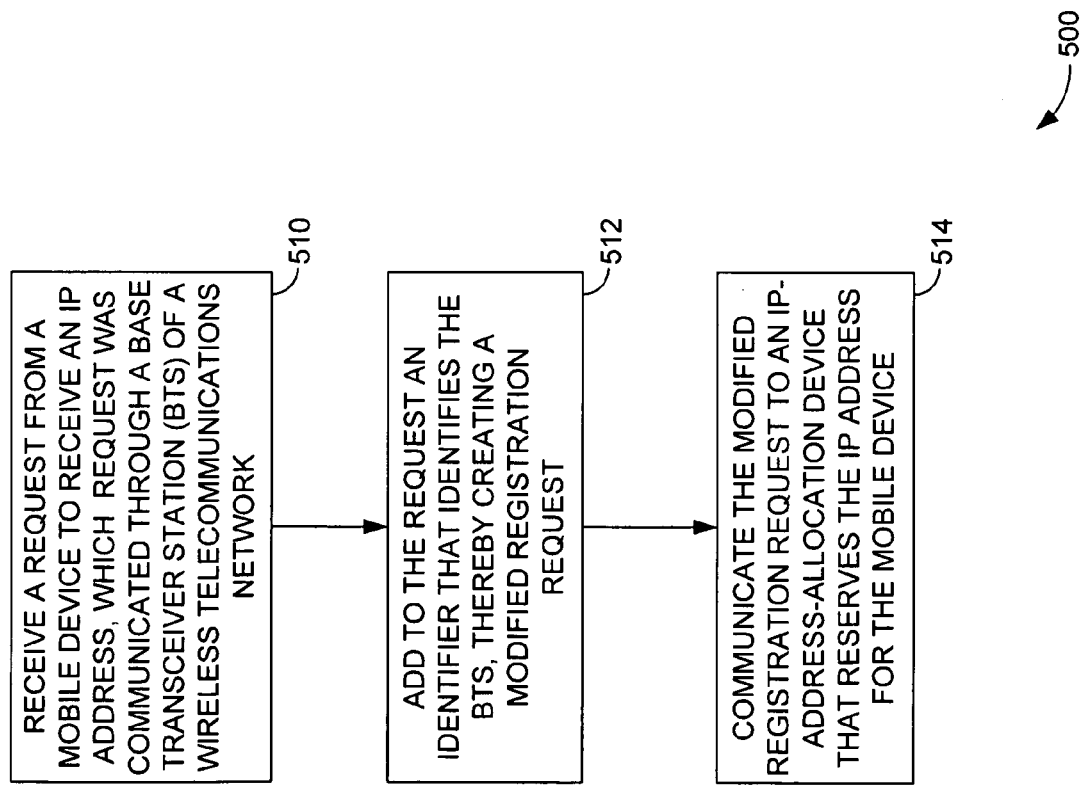
FIGS. 5-7 depict illustrative methods of enabling an action to take place based on data-usage characteristics of a mobile device according to various embodiments of the present invention.

Turning now to FIG. 5, an illustrative method of enabling an action to take place based on data-usage characteristics associated with a mobile device is provided and referenced generally by the numeral 500. At a step 510, a request is received from a mobile device to receive an IP address. This request would have been communicated through a base transceiver station such as BTS 220 that forms a portion of a wireless telecommunications network. As mentioned, BTS 220 enables communication of data between a mobile device such as mobile device 212 and a wireless telecommunications network. At a step 512, an identifier is added to the request that identifies the BTS through which the initial data communications traveled. At a step 514, the modified registration request is communicated to an IP-address-allocation device that reserves the IP address for the mobile device.

Figure 6:
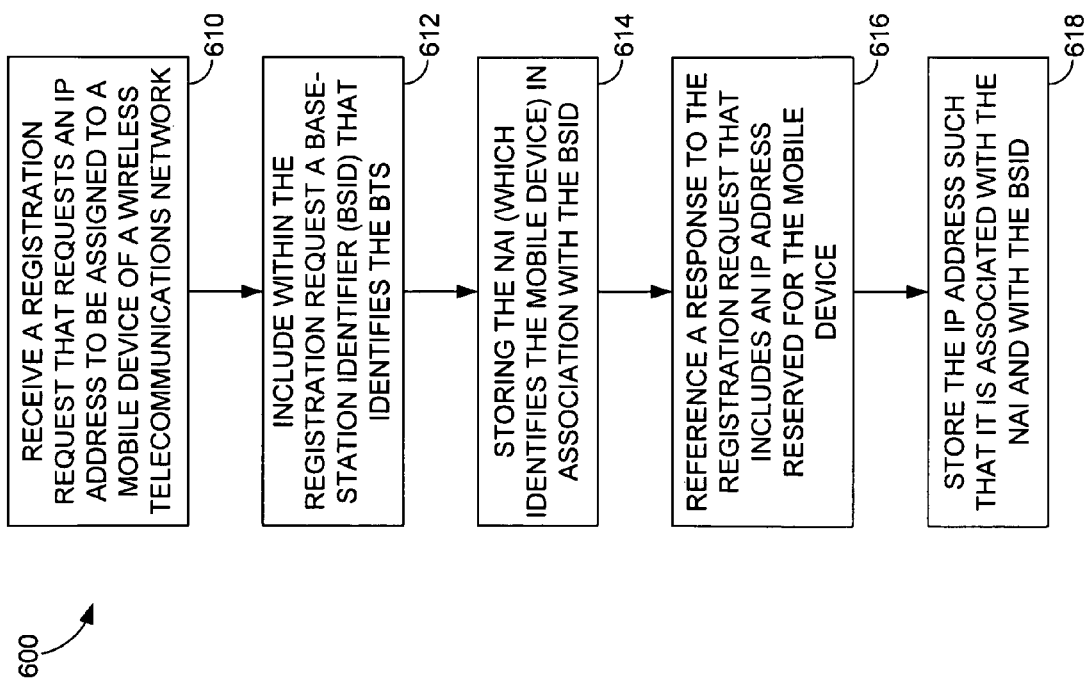

Turning now to FIG. 6, another illustrative method for enabling an action to take place based on data-usage characteristics associated with the mobile device is provided and referenced generally by the numeral 600. At a step 610, a registration request is received that requests an IP address to be assigned to a mobile device of a wireless telecommunications network. As mentioned, the mobile device communicates data through a base transceiver station or other similar device that facilitates wireless telecommunication from the mobile device through the network. The physical geographic location of the base transceiver station is known by the network. In some embodiments, the geographic locations are stored in a data store, but this may vary. The base stations are permanent structures, thus their coordinates (such as latitude and longitude) are known. In this way, when a mobile device such as mobile device 212 communicates by way of a certain base station, at least a rough location of mobile device 212 is known by the network. As mentioned, the mobile device is authenticated to ensure that it is authorized to communicate via the wireless telecommunications network. Authentication component 226 can perform this or other functions.

At a step 612, a base station identifier (BSID) is included in the registration request. The BSID identifies the base station through which the request came. In one embodiment, including the BSID includes embedding it in a given portion of the registration request. This portion can be characterized by a starting bit location and an ending bit location, which is illustratively shown in FIG. 4. As mentioned, in some embodiments, the presence of the BSID is indicated by a flag such as flag 412. It is not the case that the flag identifies the BSID per se as much as it identifies that other information follows, which other information might be BSID 418, which a receiving device can process. That is, in some embodiments, a device such as router 230 knows that if flag 412 is set, then BSID 418 will be so many bits long and start at such and such bit location. In other embodiments, network device 232 receives data packet 400, which might actually be multiple packets, in which BSID 418 is added as a tail to another packet instead of embedded within a first packet but knows to retrieve the data just the same (as appropriately programmed). The starting bit location can begin after a header portion 410 of the registration request. In some embodiments, flag 412 merely indicates the ending bit location with the starting bit location being fixed or known. In still other embodiments, flag 412 indicates a number of bits that make up the given portion of the registration request. In this way, the ending bit location is not necessary to be known; enough information is known by having knowledge of how long BSID portion 418 is.

At a step 614, the NAI (which identifies the mobile device) is stored in association with the BSID. We have previously described an illustrative process for carrying this out and show examples in connection with FIG. 3. In some embodiments, this information is stored in a database coupled to a computing device such as network device 232, while in other embodiments it is stored within network device 232.

At a step 616, a response to the registration request is referenced. The response includes an IP address reserved for the mobile device. By way of example, an illustrative response includes response 344, which includes IP address 346 reserved for mobile device 310. This response can also include an NAI such as NAI 326.

At a step 618, the IP address is stored such that it is associated with both the NAI and the BSID. An example of this is shown in row 350 of FIG. 3. As mentioned, exemplary actions include performing a deep-packet-inspection analysis on data packets that include the given IP address (any IP address), monitoring data communicated because of the mobile device, regulating a flow of data bound for the mobile device, and/or regulating a flow of data from the mobile device.

Figure 7:
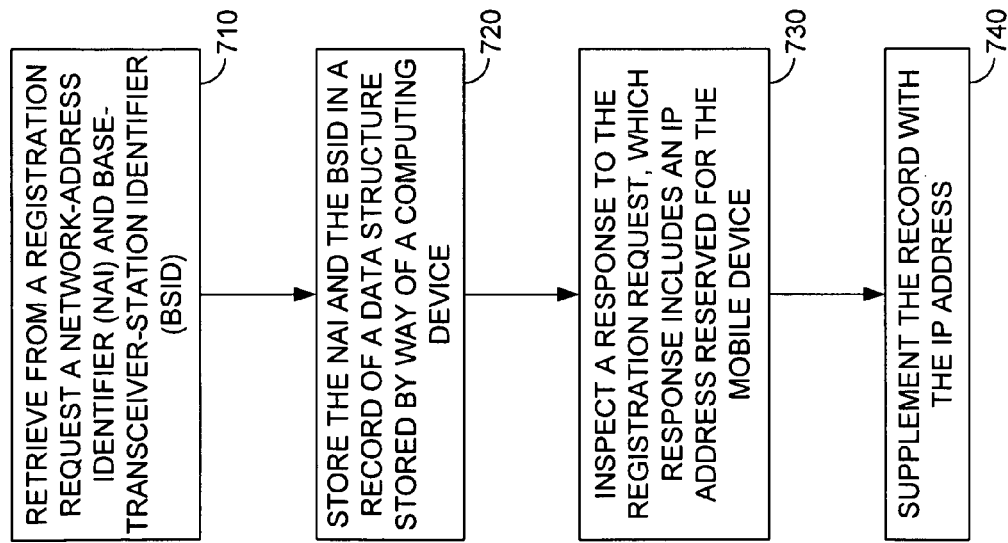

Turning now to FIG. 7, another illustrative method for enabling an action to take place based on data-usage characteristics of a mobile device is provided and referenced generally by the numeral 700. At a step 710, a network-address identifier and BSID are retrieved from a registration request.

The registration request is a request to register the mobile device with a wireless telecommunications network as mentioned. At a step 720, the NAI and the BSID are stored in conjunction with each other by way of a computing device, such as network device 232. At a step 730, a response to the registration request is inspected. An illustrative response is response 344 of FIG. 3. In one embodiment, the response includes an IP address reserved for the mobile device, such as IP address 346. At a step 740, the record is supplemented with the IP address. An illustrative record includes record 350 of FIG. 3 which is supplemented to include an IP address such as "1.2.3.4" which is illustrative in form and substance.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Nontransitory computer-readable media having computer-executable instructions embodied thereon that, when executed, perform a method of enabling an action to take place based on data-usage characteristics associated with a mobile device, the method comprising:
   receiving a registration request that requests an IP address to be assigned to the mobile device that has been authenticated by an authenticating device that is associated with a wireless telecommunications network ("network"), wherein the mobile device communicates data through a base transceiver station (BTS), which facilitates wireless communication from the mobile device through the network and whose geographic location is known by the network;
   including within the registration request a base-station identifier (BSID) that identifies the BTS,
      (A) wherein including the BSID includes embedding the BSID in a given portion of the registration request that is characterized by a starting bit location and an ending bit location,
      (B) wherein a presence of the BSID is indicated by a flag within the registration request,
      (C) wherein the starting bit location begins after a header portion of the registration request,
      (D) wherein the ending bit location is indicated by way of the flag in the registration request, and
   wherein the registration request also includes a network-address identifier (NAI), which is useable by the network to uniquely identify the mobile device;
      by way of a computing device, storing the NAI in association with the BSID;
      referencing a response to the registration request, which response includes an IP address reserved for the mobile device, wherein the response includes the NAI; and
      storing the IP address such that it is associated with the NAI and with the BSID, thereby linking location information by way of the BSID with data communicated to and from the mobile device.

2. The media of claim 1, wherein the authenticating confirms that the mobile device is authorized to communicate via the network.

3. The media of claim 1, wherein the flag indicates the ending bit location.

4. The media of claim 1, wherein the flag indicates a number of bits that make up the given portion of the registration request.

5. The media of claim 1, wherein the storing the NAI in association with the BSID includes storing the NAI and the BSID in a database coupled to the computing device.

6. The media of claim 1, wherein the action includes one or more of the following:
   performing a deep-packet-inspection analysis on data packets that include the IP address;
   monitoring data communicated because of the mobile device;
   regulating a flow of data bound for the mobile device;
   regulating a flow of data from the mobile device; and
   performing a load-balancing process by involving other base stations capable of servicing the mobile device.

7. Nontransitory computer-readable media having computer-executable instructions embodied thereon that, when executed, perform a method of enabling an action to take place based on data-usage characteristics associated with a mobile device, the method comprising:
   retrieving from a registration request a network-address identifier (NAI) and base-transceiver-station identifier (BSID),
      (A) wherein the registration request is a request to register the mobile device with a wireless telecommunications network so that it can send or receive data through the wireless telecommunications network ("network"),
      (B) wherein the BSID identifies a base transceiver station (BTS) that the mobile device is using to communicate with the network and wherein a location of the BTS is capable of being determined by way of the BSID,
      (C) wherein the BSID is embedded in a given portion of the registration request that is characterized by a starting bit location and an ending bit location,
      (D) wherein a presence of the BSID is indicated by a flag within the registration request,
      (E) wherein the starting bit location begins after a header portion of the registration request, and
      (F) wherein the ending bit location is indicated by way of the flag in the registration request;
   storing the NAI and the BSID in a record of a data structure stored by way of a computing device;
   inspecting a response to the registration request, wherein the response includes an IP (internet protocol) address reserved for the mobile device; and
   supplementing the record with the IP address.[1]

8. The media of claim 7, wherein the BSID is added to the registration request by a packet-routing device.

9. The media of claim 8, wherein the packet-routing device includes one or more of:
   a PDSN (packet data serving node);
   a GGSN (GPRS gateway support node);
   an SGSN (Serving GPRS Support Node); or
   any device that provides one or more of,
      (A) mobility management functions or
      (B) packet-routing functionality.

10. Nontransitory computer-readable media having computer-executable instructions embodied thereon that, when executed, perform a method of enabling an action to take place based on data-usage characteristics associated with a mobile device, the method comprising:

receiving a request from the mobile device to receive an IP address, the request being communicated through a base transceiver station (BTS), which enables communication of data between the mobile device and a wireless telecommunications network;

upon receiving the registration request from the mobile device through the BTS, adding to the registration request an identifier that identifies the BTS ("BSID"), which is located in a certain geographic location, thereby creating a modified registration request,
  (A) wherein the BSID is embedded in a given portion of the registration request that is characterized by a starting bit location and an ending bit location,
  (B) wherein a presence of the BSID is indicated by a flag within the registration request,
  (C) wherein the starting bit location begins after a header portion of the registration request, and
  (D) wherein the ending bit location is indicated by way of the flag in the registration request;

storing in a database said BSID along with a mobile-device identifier that is retrieved from the request;

communicating the modified registration request to an IP-address-allocation device that reserves the IP address for the mobile device; and subsequent to said IP address having been reserved for the mobile device, storing said IP address in the database, wherein said BSID, said mobile-device identifier, and said IP address are associated together.

11. The media of claim 10, wherein the IP-address allocation device is a home agent.

12. The media of claim 11, wherein the wireless telecommunications network utilizes CDMA technology.

13. The media of claim 10, further comprising storing a new BSID when said mobile device communicates data through a different BTS.

14. The media of claim 13, wherein said new BSID includes storing a new record that relates said new BSID to said mobile-device identifier and said IP address.

15. The media of claim 10, further comprising updating said IP address when it changes.

* * * * *